United States Patent
Barel et al.

(10) Patent No.: US 6,248,413 B1
(45) Date of Patent: Jun. 19, 2001

(54) THERMOPLASTIC-RESIN PARISONS AND RELATED MANUFACTURING PROCESS

(75) Inventors: Moreno Barel, S. Lucia di Piave; Franco Bellotto, Colle Umberto, both of (IT)

(73) Assignee: SIPA S.p.A., Vittorio Veneto (IT)

( * ) Notice: Subject to any disclaimer, the term of this patent is extended or adjusted under 35 U.S.C. 154(b) by 0 days.

(21) Appl. No.: 09/142,204

(22) PCT Filed: Feb. 19, 1997

(86) PCT No.: PCT/EP97/00776
  § 371 Date: Nov. 30, 1998
  § 102(e) Date: Nov. 30, 1998

(87) PCT Pub. No.: WO97/32711
  PCT Pub. Date: Sep. 12, 1997

(30) Foreign Application Priority Data

Mar. 7, 1996 (IT) .............................................. PN96A0016

(51) Int. Cl.[7] .............................. B65D 23/00; B65D 1/40
(52) U.S. Cl. .................... 428/35.7; 428/36.9; 428/36.92; 428/542.8; 220/669; 220/675
(58) Field of Search .................................. 428/35.7, 36.9, 428/36.91, 542.8, 36.92; 215/370, 371, 379, 382, 383; 220/669, 675; 264/537, 532, 535

(56) References Cited

U.S. PATENT DOCUMENTS

| | | | |
|---|---|---|---|
| 4,054,629 | * 10/1977 | Wang | 264/97 |
| 4,863,046 | * 9/1989 | Collette et al. | 215/1 |
| 4,927,679 | * 5/1990 | Beck | 428/36.92 |
| 5,066,528 | * 11/1991 | Krishnakumar et al. | 428/36.92 |
| 5,158,817 | * 10/1992 | Krishnakumar | 428/36.92 |

FOREIGN PATENT DOCUMENTS

| | | | |
|---|---|---|---|
| 247566 | * | 11/1987 | (EP) . |
| 322651 A2 | * | 7/1989 | (EP) . |
| 445465 | * | 9/1991 | (EP) . |
| 482652 | * | 4/1992 | (EP) . |
| 2040216 | * | 8/1980 | (GB) . |
| WO 90/04543 | * | 5/1990 | (WO) . |

* cited by examiner

*Primary Examiner*—Rena L. Dye
(74) *Attorney, Agent, or Firm*—Wenderoth, Lind & Ponack, L.L.P.

(57) ABSTRACT

A parison of thermoplastic resin to be particularly used to be subsequently blow molded to become a plastic bottle has an upper portion (H), a middle portion (L) and an end portion (N). The middle portion has, on its lower side near the terminal portion, a lower sub-portion (M) which has a thickness that is variable and smaller with respect to the wall thickness of the parison in the middle portion, with a profile in the shape of a downward narrowing frustum of a cone. Preferably, the thickness in the lower sub-portion (M) is decreased by at least 12% with respect to the thickness of the remaining middle portion of the parison, and the angle between the sides of the profile in the shape of a frustum of a cone and the axis of symmetry is between 5° and 10°. The advantages are broader process tolerances, elimination of heat conditioning treatments, reduction in resin usage.

9 Claims, 8 Drawing Sheets

| POINT | TEMP. °C |
|---|---|
| 1 | 88.4 |
| 2 | 109.1 |
| 3 | 105.7 |
| 4 | 103.9 |
| 5 | 104.0 |
| 6 | 103.9 |
| 7 | 97.2 |
| 8 | 94.1 |
| 9 | 103.0 |
| 10 | 84.7 |

SINGLE-STAGE

THERMOPLASTIC-RESIN PARISONS AND RELATED MANUFACTURING PROCESS

BACKGROUND OF THE INVENTION

The present invention refers to a parison and a related manufacturing process adapted to the production, on an industrial scale, of containers of thermoplastic resin, particularly polyethylene terephtalate (PET) and polypropylene (PP) intended for filling with liquids that may also be at a high temperature and/or carbonated, i.e. containing $CO_2$ gas (carbon dioxide).

In the field embracing the technology and the machines for manufacturing such containers there are a number of developments and improvements aimed at obtaining production processes and related apparatuses that are capable of producing the containers in an increasingly reliable, cost-effective, versatile manner, to an increasing level of quality, in a highly competitive industrial context of very large-scale production. These production processes are generally known to be capable of being schematically grouped into two basic typologies, i.e. single-stage and two-stage processes. The present invention applies to parisons obtained with both such types of processes, as well as the same respective processes.

Single-stage processes are so defined in that they are capable of forming the so-called preform, or parison, and transferring the parison from the injection mould or extrusion die (upon it having been cooled down to some appropriate temperature) to a conditioning station, where it is allowed to uniformly level at a temperature of preferred molecular orientation. The preform or parison is then transferred to a blow-moulding mould in which it is finally moulded into its desired form.

Inherent to any single-stage process is the fact that an uneven heat distribution takes place across the cross-section area of the wall thickness of the parison when the latter is transferred from the injection mould or extrusion die. Various processes have been patented concerning the times and the temperatures of the parison when it is removed from the injection mould with a view to optimizing the cycle times.

The patent literature covering single-stage processes discloses in all cases a final forming or moulding of the thermoplastic resin container which is in some way allowed, through a conditioning station, to gain a uniform wall temperature throughout the cross-section area thereof, such a temperature corresponding to the preferred molecular orientation temperature of the resin.

Two-stage processes are so defined due to the fact that the blow-moulded bottle is obtained in two distinct phases which may be carried out even at quite great intervals between each other. In fact, the actual advantage of this technology derives exactly from the circumstance that the whole process is divided into two phases that are normally carried out widely apart from each other in terms of both place and time, thereby ensuring greater flexibility from a technical, manufacturing and marketing point of view.

The individual parisons are produced in the first phase of the above process, wherein the parisons are then usually stored in situ or transported to the premises of the final user or processor.

In the second phase of the above process, the parisons are then re-conditioned to the desired temperature and, immediately thereafter, blow-moulded into the desired final products, ie. the bottles.

In addition to such a greater flexibility, two-stage processes also potentially enable considerable economies of scale to be obtained, since a single manufacturer is able to produce, in a single and same plant, the parisons that can then be used to produce various different types of bottles.

However, two-stage processes have a major inherent drawback in their greater energy usage due to the fact that, in the second phase or stage thereof, the parisons must be fully re-conditioned, ie. heated to the optimum temperature required for the subsequent blow moulding operation.

In both the single-stage and two-stage processes and plants for the production of hollow plastic products, typically bottles, parisons are obtained through continuous extrusion of a flow of thermoplastic resin, in particular polyethylene terephtalate (PET), into a plurality of multiple moulds. However, the actual production of a parison is not independent from the manner in which it is going to be blow moulded, as well as the manner in which the resulting bottle is going to be used, but must on the contrary take due account of all such variables, mainly:

the shape of the bottle,
the internal volume of the bottle,
the type of liquid which is going to be filled in the bottle and which may be either highly or normally carbonated or even simply "plain", i.e. uncarbonated,
the state of the liquid, which can be either hot or cold when filled, and
the way in which the bottle itself is going to be used, since it can be designed for disposal after use or be of the re-usable type and, as a result, refillable for a number of times after recovery, cleaning and sanitation, etc.

With reference to the shape of re-usable, or "refillable" bottles, as they are generally referred to in the art, it has been observed that these prove to be particularly well-suited to re-utilization if their bottom, or base, is given a "champagne" bottle-like shape, instead of a "petaloid"-like one, these two terms being generally and unmistakably known to those skilled in the art.

This is practically due to a twofold reason, ie. to the petaloid bottom being much more subject to crackings and breakages (stress cracking problems) during the subsequent treatments of the bottles, and to the cleanability of the bottle, in view of the re-utilization of the same, being clearly much poorer in the deep recesses of the petaloid, owing to it being hindered by the particular receptacle-like shape of said recesses.

The main problem encountered in the manufacturing of refillable bottles lies in trying to ensure an optimum distribution of the material, particularly in the area of the resting base of the bottle, and therefore a differentiated thickness pattern along the walls of the bottle and, as a result, a differentiated thickness pattern even on the parison. In fact, in view of its adequate mechanical strength at the various pressure and temperature conditions, the bottom should possess a well-defined material thickness map.

It is generally known that, while the internal pressure strength of a bottle with a petaloid bottom is given by the geometry, ie. the actual shape of the same bottom, and in particular by the ribs (tie-beams) thereof, only an adequate and properly distributed quantity of material will be able to ensure the same function of the petaloid configuration in a 'champagne' type of bottle bottom.

For instance, in the case of 2-liter bottles the 'champagne'-type bottom must have performance abilities to withstand the following treatment:

three hours at 60° C. with 25% of NaOH, followed by twenty-four hours at four volumes of $CO_2$ at 38° C.

When submitted to the above cited test conditions, the bottom of a refillable-type bottle must have the following performance:

1) it shall avoid everting, ie. bending outwards;
2) it shall avoid giving rise to stress-cracking or any other breakage of that kind;
3) it shall not cause the bottle to become unsteady on its resting base or plane;
4) it shall maintain full perpendicularity of the axis of the bottle relative to the resting base or plane.

For such performance capabilities to be reached, a 'champagne'-type bottle bottom must be given certain characteristics, which, with reference to FIG. 1, are as follows:

1) Greatest possible orientation of the amorphous zone 1. This is obviously the zone in which the orientation tends to be reduced to a minimum, while material concentration is the greatest. Since there is practically no material orientation, mechanical strength is ensured solely by the thickness thereof. However, an excessively great thickness would only mean a waste of material. Up to 25% of the overall weight of refillable bottles is in the bottom portion thereof (zone 1+zone 2). It is therefore necessary for this amorphous zone 1 to be given the greatest possible orientation, although this may prove extremely difficult to be obtained.

2) Greatest possible orientation of the amorphous zone 2. These are the most critical zones, since material orientation and distribution are decisive for the mechanical strength of the bottom.

All 'champagne'-type bottoms submitted to inner pressure must have minimum thickness values at the points generally indicated at A and A1, below which the bottom would unfailingly give way. In addition to this imperative requirement, the bottoms must also comply with another basic requirement, ie. they must have an adequately uniform thickness pattern along their circumference in correspondence of the zones 2. Only a minimum thickness difference can be at best allowed between two diametrically opposite points.

For instance, in the case of a 'champagne'-type bottom of a 2-liter refillable bottle, the greatest allowable thickness difference amounts to 0.2 to 0.25 mm. It is important for this difference to be kept as small as possible in view of minimizing non-perpendicularity of the bottle.

The extent of orientation is certainly very important, but not as important as the manner in which the material distributes itself in these zones. In both above mentioned methods, such a distribution is furthermore strongly dependent on the temperature conditioning treatment which the parisons are caused to undergo before being blow moulded, and such a conditioning treatment implies a twofold drawback: on the one side, the parison wall is heated up in a substantially uniform manner and this leads to a fairly uniform stretching of the material during blow moulding, ie. gives rise to a conflicting situation with the requirement of a differentiated material distribution, according to a well-defined pattern, along the various zones of the bottle; on the other side, such a conditioning phase of the process, in single-stage processes, slows down and complicates the entire production process due to a variety of technical and economical reasons, as those skilled in the art are well aware of.

As far as two-stage processes and related parisons are concerned, it is a fact inherent thereto that, being it necessary, due to inherent plant limitations, for the parison to be conditioned to a substantially uniform temperature, while it is on the other hand necessary for the bottom of the same parison to then be stretched according to a very differentiated pattern, it ensues that, in order to ensure a satisfactory strength of the base, or contact zone, which usually undergoes greater stretching, the need arises for the use of parisons having an adequate thickness. However, the thickness required for the highly stretched zones turns out to be actually excessive for the other zones of both the bottom and the remaining body portions of the parison, so that such a thickness constraint conclusively translates into an ineffectual consumption of plastic material used in those portions of the bottles that undergo a low-to-medium level of stretching.

In order to reduce such an ineffectual utilization of material, efforts are made in view of keeping the conditioning temperature within very tight limits; however, controlling such a process parameter is not always easily or economically possible.

From U.S. Pat. No. 5,158,817 is known the shape of a preform for a generally rectangular container, specifically of an oval or oblong cross section. However such kind of preform is not best used for bottles having a cylindrical shape and a bottom of the "champagne" type.

From WO 90/04543 a particular shape of preform is known. However such document does refer to bottles for one-piece disposable use (i.e. single service, see row 2 of the relevant description); therefore such kinds of preforms are not optimized for "refillable or returnable type" bottles, which is the object of the present patent application.

From EP 0 445 465, the construction of preform for returnable bottles is known; however the illustrated preforms are used for generic purpose and processing, while it is well known that, due to different heating requirements in the one-stage and bi-stage process, the relevant preforms have to be shaped accordingly and differently.

The basic drawbacks of the present technology for the production of parisons can therefore be summarized as follows:

a) criticalness of process tolerances, known also as "process window", when blow moulding parisons with a substantially constant thickness of their walls, due to the fact that the material is at the same starting temperature, but must be stretched to very different values, while keeping pre-defined minimum thicknesses in the most critical zone of the resting base of the bottle;

b) the use of parisons with a constant wall thickness has the consequence that the final bottle happens to have some of its zones with a significantly greater thickness than the one which would be actually required to withstand the respective stresses or loads, so that it can be concluded that at least a part of the material used in the zones is practically wasted;

c) in single-stage plants, introducing the temperature conditioning phase before the actual blow moulding phase gives rise to a number of problems, the solution of which implies high costs and greater complications in the construction of the related plant, as well as in the process performed in the same plant.

SUMMARY OF THE INVENTION

Considering all these drawbacks, it is therefore a main purpose of the present invention to provide a) a parison for use in a single-stage process for producing a container of thermoplastic resin which is thermally stable, capable of being filled with both hot liquids and carbonated liquids, capable of being re-used for a number of times, and provided with a 'champagne'- type bottom offering the afore mentioned performance capabilities, and b) a parison for use in a two-stage process for producing containers of a type similar to the one described above with reference to single-stage processes, which further enables material usage to be reduced to a minimum, while using presently available, easily and economically implementable techniques for both types of preforms and eliminating the parison conditioning phase before the blow moulding phase in single-stage processes only.

It is a further purpose of the present invention to provide a parison having the above mentioned features and properties which may be used to also produce bottles with a 'petaloid'-type bottom, as well as disposable, ie. non-reusable bottles.

These and further purposes of the present invention will be readily and clearly understood by those skilled in the art from the reading and comprehension of the description given below.

These aims of the present invention are substantially reached in a controlled combination of the obtainment of a particular profile and distribution of the thickness of the wall of the parison and, as far as single-stage processes are concerned, the parison cooling time, including the elimination of the temperature conditioning phase.

BRIEF DESCRIPTION OF THE DRAWINGS

A non-limiting example of the invention is described and illustrated in detail below with reference to the accompanying drawings, in which.

DETAILED DESCRIPTION OF THE PREFERRED EMBODIMENTS

The actual target which both methods of solution described hereinafter are aiming at is based on the practical consideration that the portion of parison which undergoes the greatest extent of stretching in view of its being transformed into the base of the container is at the same time the portion which, after its being converted into such a base, is most stressed, ie. is exposed to the greatest loads, and must therefore be capable of ensuring the best possible mechanical performance, such a basic consideration applying actually to all types of parisons, i.e. both those which are adapted to be blow moulded in single-stage plants and those which are on the contrary adapted to be blow moulded in two-stage plants.

This leads to the definition of parisons in which the portion is varied, and particularly "adapted" to the actual blow-moulding conditions, with respect to the remaining body of the parison.

Such an aim is reached through a controlled combination of the two basic variables affecting the stretching of the parison, ie. the thickness of the wall of the parison and the temperature during stretching.

However, since the temperature during the stretching phase depends on the thermal-treatment and general conditions in which the parison was being held before the phase, the conditions generally varying to a considerable extent in single-stage and two-stage processes, it logically ensues that even the method conceived to solve this problem, i.e. the optimum combination of thickness and thermal treatment, will be fully different in the two processes, and this is the reason why the continuation of the description will be divided into two distinct parts applying solely to either one of the two described processes.

Parison for Single-stage Plants and Processes

The first aim that the present invention is meant to reach is the definition of such a profile and such a thickness map or pattern of the parison as to obtain, after the same parison is blow moulded in a single-stage process, an automatic distribution of the plastic material in the zones 1 and 2 of the bottom, wherein this must be obtained without the aid of any intermediate thermal conditioning means or treatment provided between the injection mould and the blow moulding mould.

Figure 1:
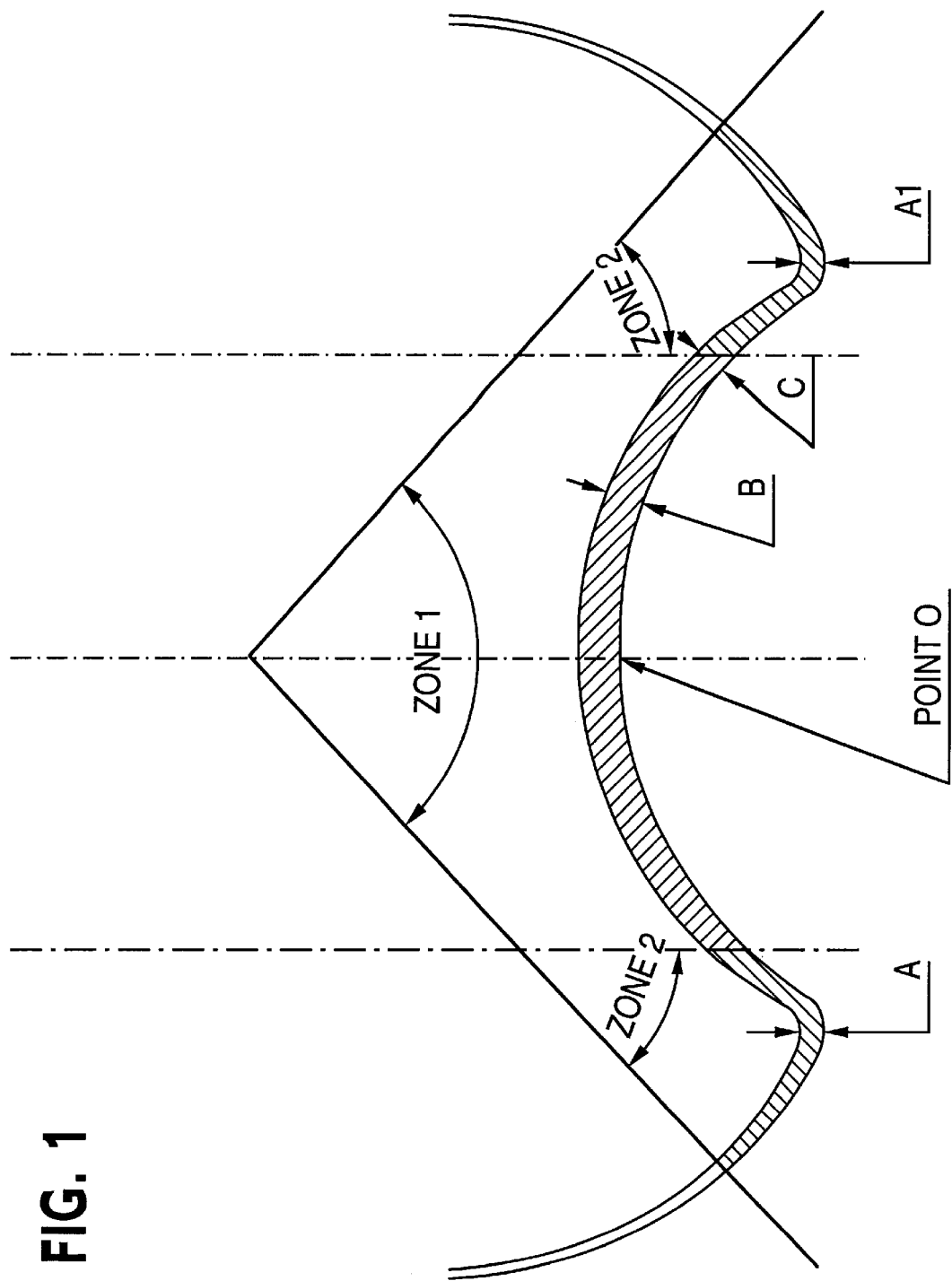
FIG. 1 is a cross-sectional view of a 'champagne'-type bottom for a typical refillable bottle.
Figure 2:
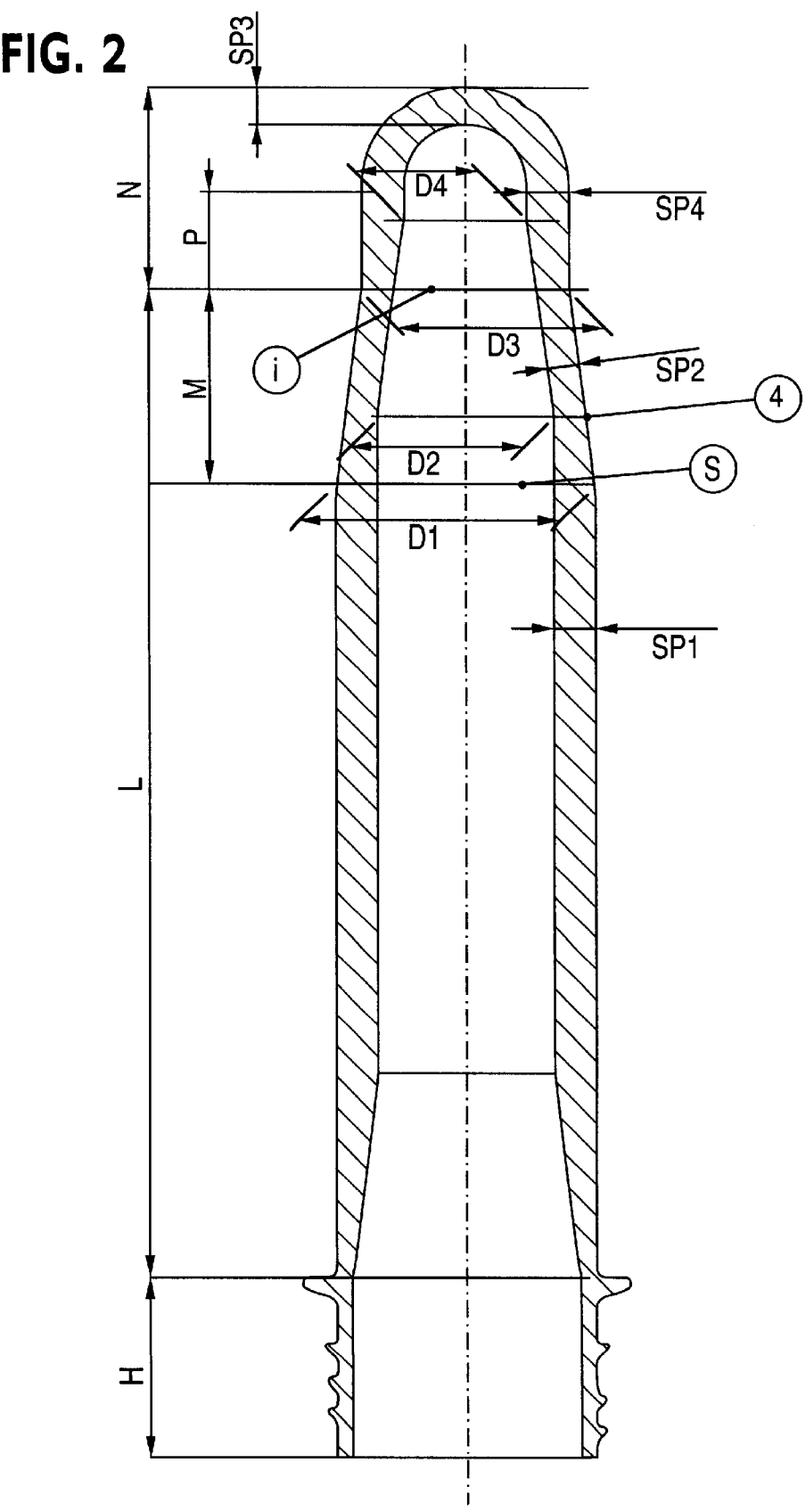
FIG. 2 is a vertical, median cross-sectional view of a parison according to the present invention, capable of being blow moulded in a single-stage plant.

To the purpose of a better and clearer explanation, the parison shown in FIG. 2 is subdivided into three distinct, superposed portions, ie. an upper portion or neck H, a middle portion L, and an end portion N in which the parison contracts and closes up in the form of a half-sphere. In the lower portion of the middle parison portion L a lower sub-portion M is furthermore defined close to the end portion; this can be defined as that portion of the parison which, after blow moulding, becomes the resting zone of the base of the bottle, at A and A1, and the zones 2 adjacent to such a base (FIG. 1).

Figure 3:
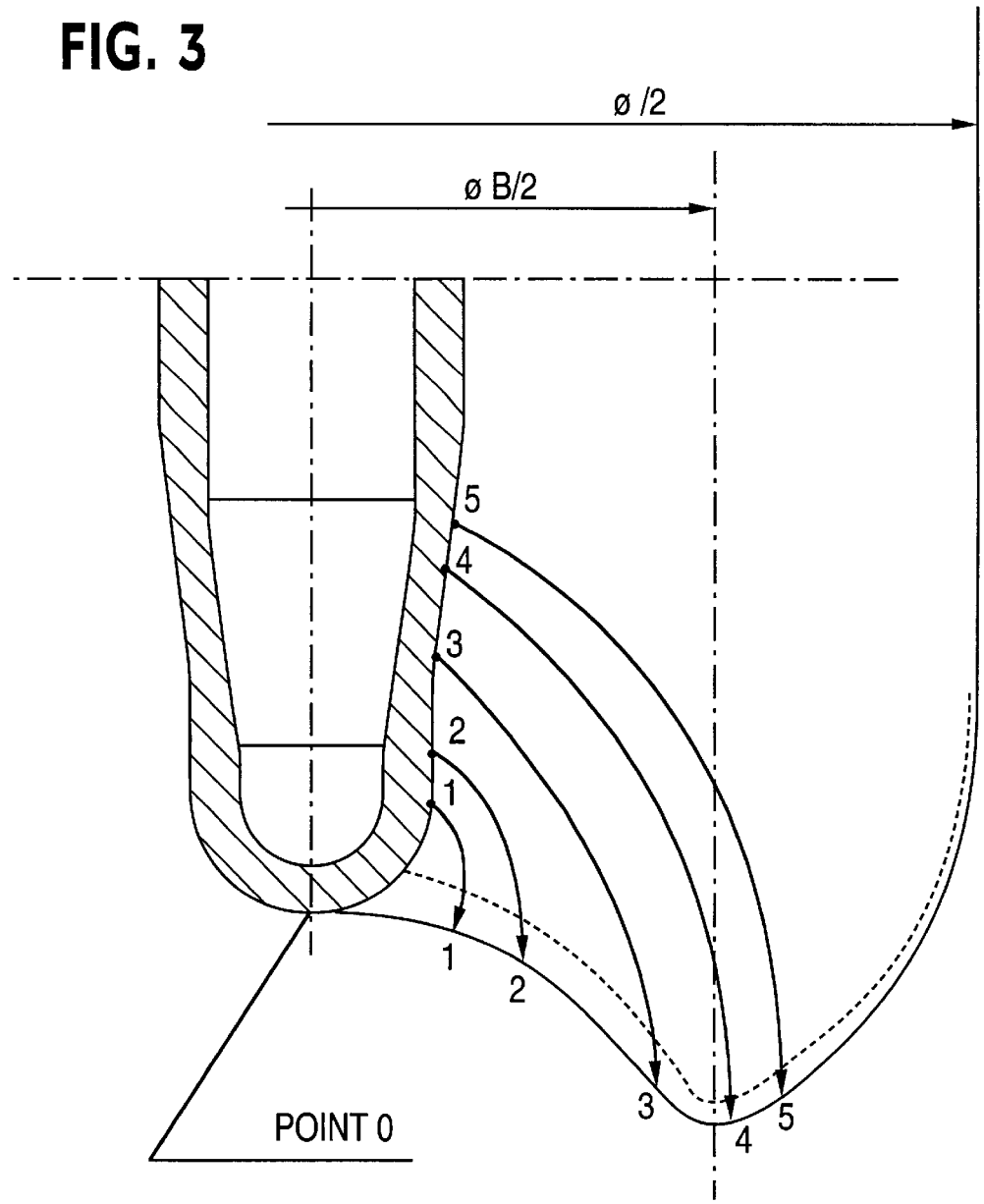
FIG. 3 is a vertical, median cross-sectional view of the deformation lines of the bottom of a parison according to the present invention.

To this purpose, and with particular reference to the 'champagne'-type bottom, a special parison has been developed and experimentally tested, which is provided with a variable thickness pattern in the lower sub-portion M, as which better illustrated in FIGS. 2 and 3.

The process which led to such a thickness profile started from the basic consideration that it is actually of fundamental importance for the parison to possess a particular thermal profile so as to ensure that, during blow moulding, the material will distribute according to the required particular map or pattern of thicknesses of the bottle.

As already emphasized, the most critical zones in this context are known to be the zones 2 situated close to the resting base of the bottle and, above all, the points 4 that correspond to the resting base itself, and it is for this particular reason that the thermal profile of the parison must be such as to ensure a lower temperature in the zones 2 of the bottom (as a matter of fact, the zones 2 are actually a single ring-shaped zone) so as to prevent the material from stretching to an excessive extent, thereby reducing the thickness at the contact points 4.

In a traditional single-stage blow moulding process, the parison leaves the injection mould with a temperature which is uniform all along its axis, so that a treatment becomes necessary, before blow moulding, aimed at re-distributing the temperature in view of creating an optimum profile thereof.

Quite on the contrary, the parison according to the present invention enables the same parison to come directly out of the injection mould with a thermal profile which is ideal in view of blow moulding according to the considerations set forth above.

The basic feature of the present invention is that, in the lower sub-portion M, the outside diameter D1 and the inside diameter D2 of the parison decrease progressively following a profile in the shape of a frustum of a cone, until they become D3 and D4, respectively, for regaining, possibly after a short length of portion with variable-thickness walls, the usual half-sphere profile in the end portion N.

Such a decrease of the wall diameters has a first effect in that, in the zones involved by the narrowing, a thickness SP2 is brought about which is smaller than the thickness SP1 of the parison body, so as to enable a lower temperature to prevail in such a portion of the parison, since a quicker cooling is able to take place in this portion of thickness SP1 than in the adjacent zones.

During the subsequent blow moulding phase, the lower temperature reached by the material in the sub-portion M in the shape of a frustum of a cone does not allow, notwithstanding the high stretching ratio, for the material to undergo any excessive extent of stretching and, at any rate, any extent of stretching that may be comparable with the one which is imposed on the material of the adjacent portions, considering that, since such material is at higher temperatures, it tends to stretch to a much greater extent, although it is exposed to a smaller stretching ratio, as in the amorphous zone adjacent to the injection point.

It has therefore been proven experimentally that, by appropriately decreasing the diameters of the parison in the sub-portion M, it is possible for a differentiated cooling pattern to be obtained throughout the same parison, to such an extent as to enable both the subsequent blow moulding phase to be carried out immediately thereupon and an optimum thermal map, or heat distribution pattern, to be obtained in the parison with a view to obtaining the desired thicknesses in the bottom of the bottle without the need for any intermediate conditioning phase.

Based on such an observation, and it being further obvious that each type of bottle requires a special parison, it is possible for the ideal thickness profile to be identified experimentally for each bottle, and therefore for the respective parison, in view of obtaining the results that are the actual purpose of the present invention as described in the foregoing description.

It has been particularly observed that there are a number of characterizations that are common to the various types of parisons and that, when applied individually or in different combinations thereof, tend to improve the results that can be achieved or enable the desired results to be more easily obtained, such characterizations basically including:

constancy of the angle a (FIG. 2) of inclination, with respect to the axis of the parison, of the inner wall and the outer wall of said sub-portion M in the shape of a frustum of cone, said angle ranging from 5° to 10°;

decrease in the thickness of the walls by starting from the upper limit SP1 down to the lower limit SP2 of the lower sub-portion M, since this definitely contributes to decreasing the mass of the corresponding walls and, as a result, further accelerating the cooling rate thereof;

reduction of the thickness SP2 of the sub-portion M by 5% to 10% with respect to the thickness SP1 of the remaining middle portion L, also due to the walls of the sub-portion M being bent inwards;

maintenance of the wall thickness SP4, along the length of the lower Part H of portion P immediately below the sub-portion M, at a value which is equal to or, at any rate, not smaller than 5% with respect to the thickness SP1, so as to obtain the greatest extent of biaxial orientation in the zone 1 of the bottom;

the thickness SP3 of the wall at the lowest point of the end portion N has a value of approx. 0.7×SP1;

the height of the sub-portion M is determined experimentally in accordance with the desired distribution of material in the bottom; and for the thickness in the contact zone of the base of a 'champagne'-type bottom, as referred to generally at A and A1 in the cross-sectional illustration appearing in FIG. 1, to be held more effectively, it has been ascertained experimentally that the geometry, ie. the shape of both the parison and the respective blow moulding tool must be such as to ensure that the contact zone of the base substantially corresponds to the median points 4 of the sub-portion M; this may be explained by the fact that such median points are, albeit not to a very considerable extent, subject to more intensive cooling and, therefore, are less prone to stretching and, as a result, to a reduction in their thickness.

Figure 4:
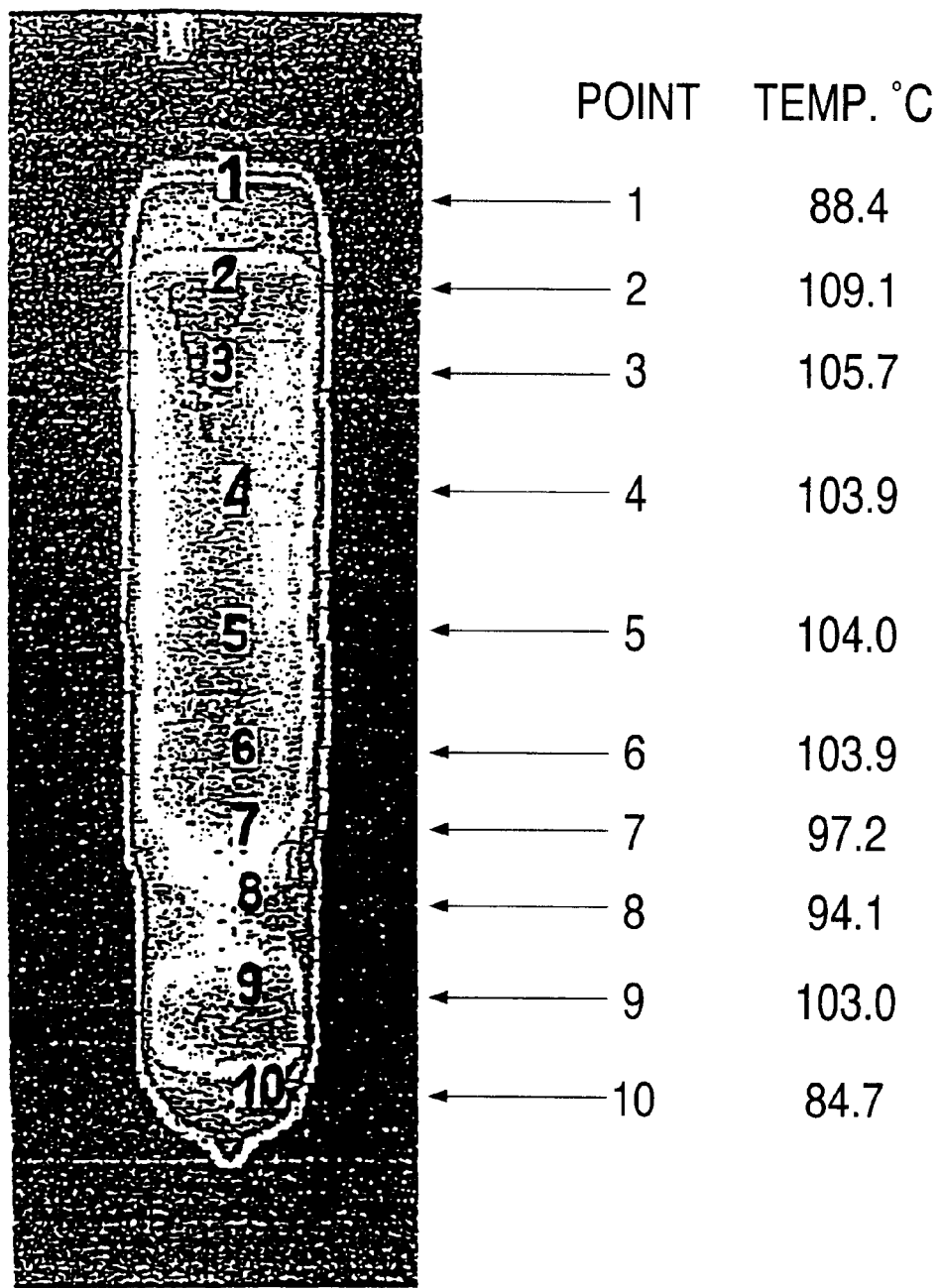
FIG. 4 is a view of the thermal map of a typical parison as detected when coming out of the injection mould.

With reference to FIG. 4, which shows the thermal profile detected experimentally on a parison according to the invention as it comes out of the related injection mould, the thermal gradient can be noticed to be lower at the points 7 and 8 than in the other parts of the parison.

During blow moulding, said points 7 and 8 shown in FIG. 4 originate from the zones 2 (FIG. 1) of the bottom, ie. the material available in said points 7 and 8, and corresponding to the sub-portion M, is caused to automatically flow and arrange itself in the zones 2 of the bottom, at the points A and A1 (FIG. 1) thereof, during blow moulding.

Further clear benefits and advantages of the present invention have emerged from systematically performed experiments, ie.:

1) A greater extent of biaxial orientation; in fact, considering that in the sub-portion M of the parison the diameter D3 and D4 are smaller than D1 and D2, respectively, it ensues that the stretching ratios, considering Ø as the resting diameter (critical zone) of the bottle, are greater, ie. Ø:D4>Ø:D2 and Ø:D3>Ø:D1. Such an increase in the extent of orientation, in the sense of an increase in the stretching ratio, amounts to anywhere between approx. 10% and 15% and depends on the actual size and shape of the bottle. An increase in the extent of orientation is generally known to translate into an increase in the mechanical performance capabilities and, above all, a reduction of the stress cracking effect at the points 4, such an effect being commonly known to be the worst enemy of refillable bottles.

2) In order to be able to make a parison in a single-stage process, it is of paramount importance for the problem of stress cracking in refillable bottles to be first of all solved. Now, moisture is the most important element as far as the development of such a stress cracking effect is concerned. According to the present invention, any risk of moisture being absorbed is on the contrary eliminated, since the parison is blow moulded immediately upon its being formed in the injection mould, so that it is practically left no time for absorbing humidity from the ambient environment.

It has furthermore been experimentally found to be particularly advantageous, to the purpose of a more effective 'guidance' of the temperature in the zone subject to the greatest extent of stretching, ie. the sub-portion M, for the reduction in the thickness of the wall to be brought about not only through the simple inward tapering of the afore cited angle a, but also through a different distance, from the bottom of the parison, of the points at which the tapering begins and ends, as far as both the outside diameter and the inside diameter are concerned.

Figure 5:
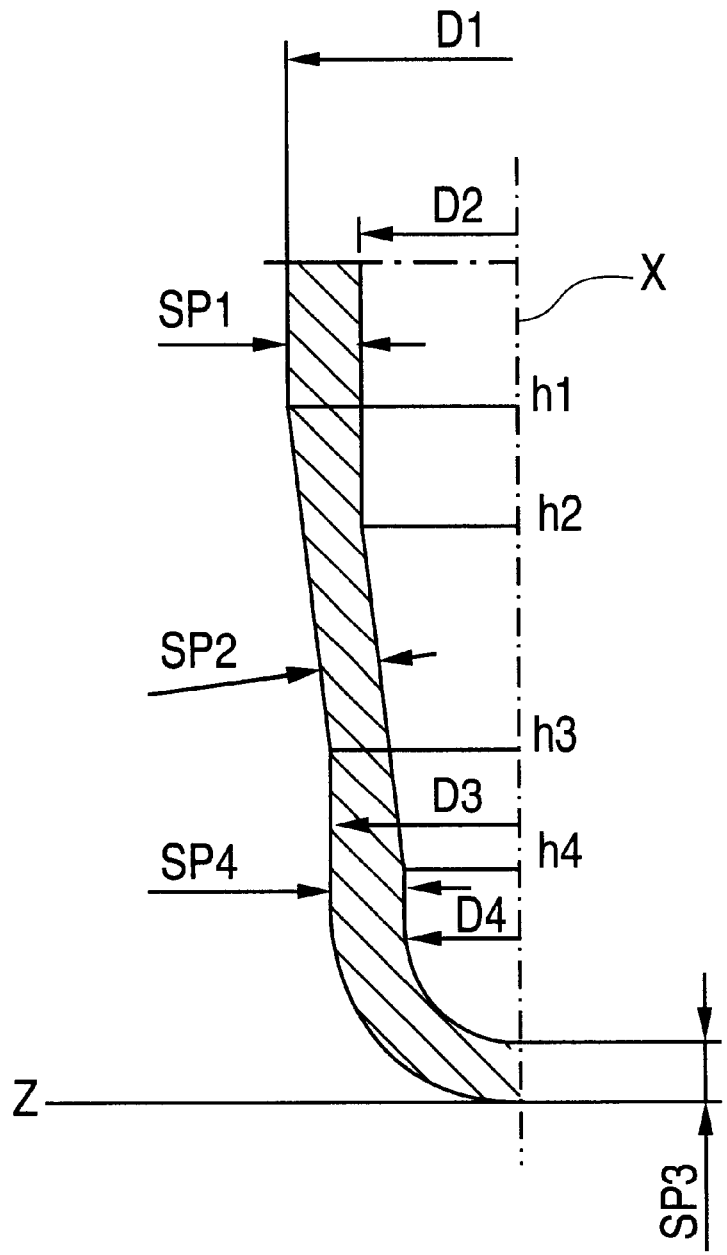
FIG. 5 is an enlarged view of a median vertical section of the wall of the parison illustrated in FIG. 2, as referred to a particular portion of the wall.

With reference to FIG. 5, in which an enlarged median vertical section of the wall of the parison shown in FIG. 2 is illustrated as referred to the sub-portion M of said wall, the height $h_1$, at which the outer diameter D1 of the parison starts to become narrower, shall be slightly higher than the height $h_2$ at which also the inside diameter D2 of the parison starts to become narrower, whereas the height $h_3$, at which the gradual narrowing of the outside diameter D3 of the parison terminates, shall be slightly higher than the height $h_4$ at which the gradual narrowing of the inside diameter D4 of the parison also terminates, the height differences being determinable in accordance with the afore cited angle a and the desired reduction in thickness in the sub-portion M.

As a further explanation of the illustration appearing in FIG. 5, it should be stressed that the described heights h refer to the respective distance from a single reference level Z situated below the parison and perpendicular to the axis X thereof.

Parison for Two-stage Plants and Processes

Figure 6:
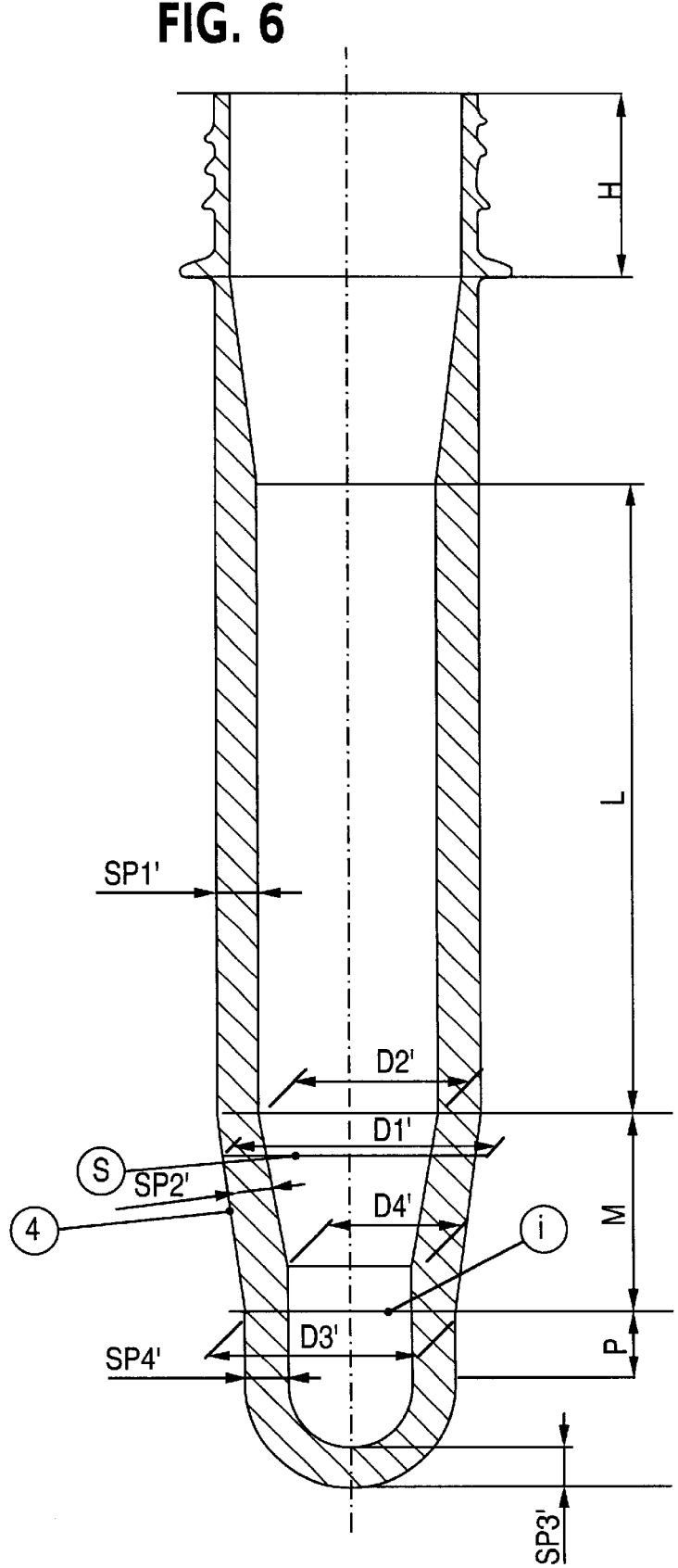
FIG. 6 is a view of the median vertical section of a parison according to the present invention, capable of being blow moulded in a two-stage plant.
Figure 7:
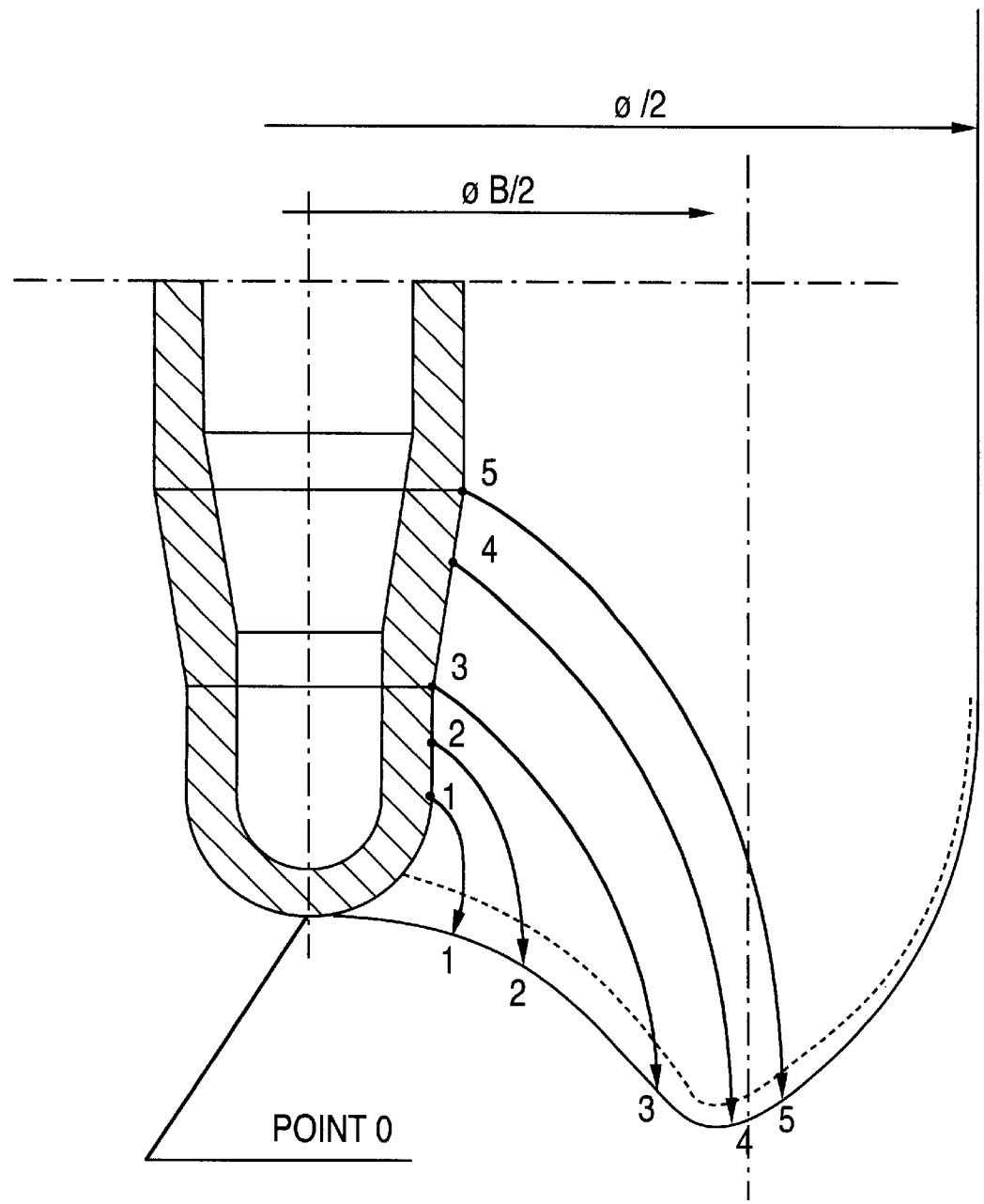
FIG. 7 is a vertical, median cross-sectional view of the deformation lines of the bottom of a parison according to the present invention, during blow moulding in a two-stage method.
Figure 8:
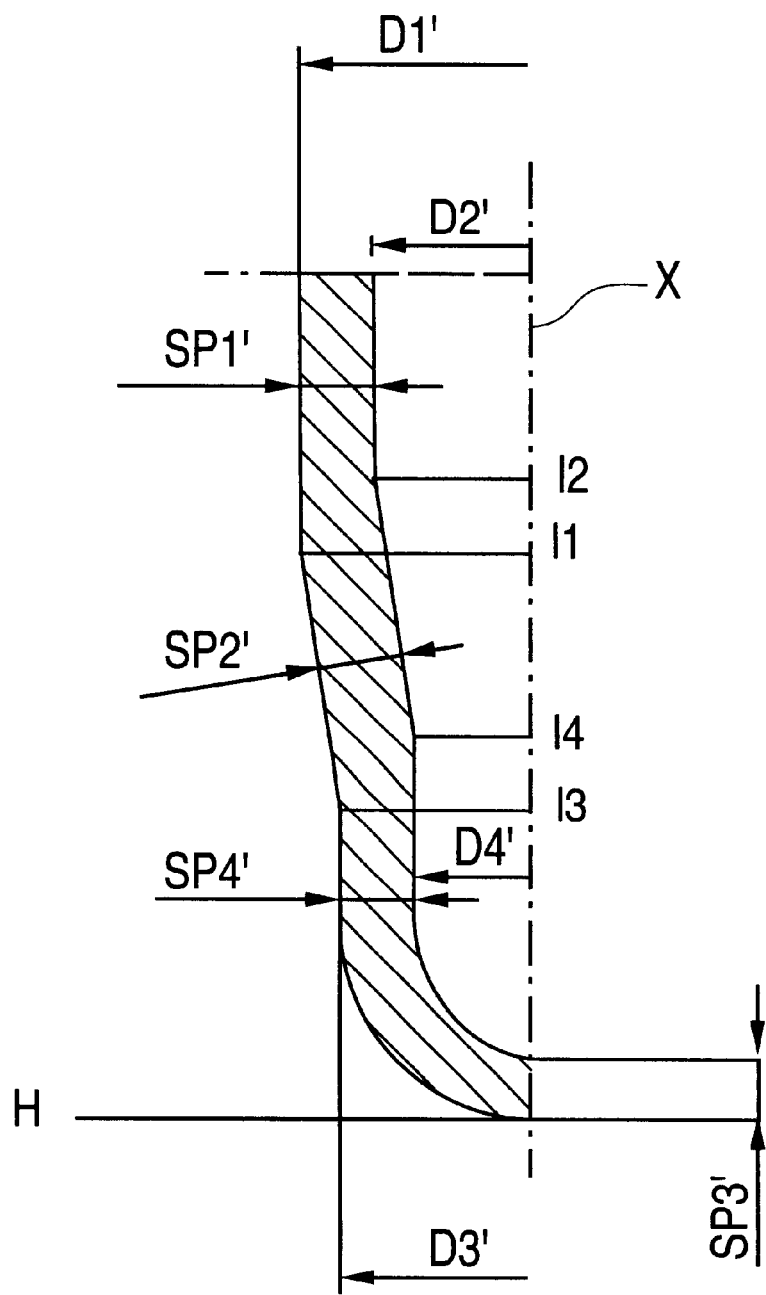
FIG. 8 is an enlarged view of a median vertical section of the wall of the parison illustrated in FIG. 6, as referred to a particular portion of the wall.

With reference to the parisons illustrated in FIGS. 6, 7 and 8, which are provided for being blow moulded in a two-stage process, in view of favouring a better understanding, a number of references and considerations will be used which have been already used in connection with the single-stage processes and are applicable to typical two-stage process conditions as well.

The parison illustrated in FIG. 6 is again subdivided into three distinct, superposed portions, ie. an upper portion H, a middle portion L, and an end portion N in which the parison contracts and closes up in the form of a half-sphere. In the lower portion of the middle parison portion L a lower sub-portion M is furthermore defined close to the end portion; this can be defined as that portion of parison which, after blow moulding, becomes the resting zone of the base of the bottle, at A and A1, and the zones 2 adjacent to such a base (FIG. 7).

To this purpose, and with particular reference to the 'champagne'-type bottom, a special parison has been developed and experimentally tested which is provided with a variable thickness pattern in the lower sub-portion M, and this is better illustrated in FIGS. 6 and 7.

The process which led to such a thickness profile started from the basic consideration that it is actually of fundamental importance for the parison to possess a particular thermal profile so as to ensure that, during blow moulding, the material will distribute according to the required particular map or pattern of thicknesses of the bottle.

As already emphasized, the most critical zones in this context are known to be the zones 2 situated close to the resting base of the bottle and, above all, the points 4 that correspond to the resting base itself, and it is for this particular reason that the thermal profile of the parison must be such as to ensure a lower temperature in the zones 2 of the bottom (as a matter of fact, the zones 2 are actually a single ring-shaped zone) so as to prevent the material from stretching to an excessive extent, thereby reducing the thickness at the contact points 4.

In a traditional two-stage blow moulding process, the parison starts in the same process from a cold condition and must therefore be conditioned, ie. heated up to a temperature which is uniform all along its axis, so that a treatment becomes necessary, before blow moulding, aimed at distributing the temperature in a uniform manner all along the body thereof.

Quite on the contrary, the parison according to the present invention enables the same parison to come directly out of the conditioning phase, and therefore to be available at the beginning of the blow moulding phase, with a thermal profile which is ideal for blow moulding according to the considerations set forth above.

The basic feature of the present invention is that, in the lower sub-portion M, the outside diameter D1' and the inside diameter D2' of the parison decrease progressively following a profile in the shape of a frustum of a cone, until they become D3' and D4', respectively, for regaining the usual half-sphere profile in the end portion N.

However, notwithstanding such a double narrowing, the wall thickness is actually increased from a value SP1' to a greater value SP2', the increase being obtained by differentiating the levels $l_1$, $l_2$ at which the outside and inside diameters D1' and D2', respectively, start to become narrower, and similarly by differentiating the levels $l_3$, $l_4$ at which the outside and inside diameters D3' and D4', respectively, regain their constant size towards the end portion N.

With reference to FIG. 8, in which an enlarged median vertical section of the wall of the parison shown in FIG. 6 is illustrated as referred to the sub-portion M of said wall, it should be stressed that the various herein indicated heights $l_1$, $l_2$, $l_3$, $l_4$ refer to the respective distance from a single reference level H situated below the parison and perpendicular to the axis X thereof.

The height $l_1$, at which the outer diameter D1' of the parison starts to become narrower, shall be lower than the height $l_2$ at which also the inside diameter D2' of the parison starts to become narrower, whereas the height $l_3$, at which the gradual narrowing of the outside diameter D3' of the parison terminates, shall be slightly lower than the height $l_4$ at which the gradual narrowing of the inside diameter D4' of the parison also terminates, the height differences being determinable in accordance with the afore cited angle a and the desired reduction in thickness in the sub-portion M.

Such a particular geometry of the wall has a first effect in that, in the sub-portion M, in which the diameters become narrower, but the wall thickness is increased, a thickness SP2' is brought about which is greater than the thickness SP1' of the parison body. This brings about a greater thermal capacity in the sub-portion and, therefore, a lesser extent of heating in the conditioning phase required by each two-stage process, thereby reaching practically a lower temperature in such a portion of the parison than in the adjacent zones.

It will be now fully appreciated that such a lower temperature is exactly the result which is actually aimed at also in conjunction with the parisons to be blow moulded in a single-stage process, since the effect that is brought about by the lower temperature, i.e. a lesser extent of material stretching in the zones involved, is common to both methods.

Going back to the two-stage process, during the subsequent blow moulding phase the lower temperature reached by the material in the sub-portion M in the shape of a frustum of a cone does not allow, notwithstanding the high stretching ratio, for the material to undergo any excessive extent of stretching and, at any rate, any extent of stretching that may be comparable with the one which is imposed to the material of the adjacent portions, considering that, since such material is at higher temperatures, it tends to stretch to a much greater extent, although it is exposed to a smaller stretching ratio as in the amorphous zone adjacent to the injection point.

It has therefore been proven experimentally that, by appropriately increasing the diameters of the parison in the sub-portion M of a parison to be blow moulded in a two-stage process, it is possible for a differentiated cooling pattern to be obtained throughout the same parison, to such an extent as to enable an optimum thermal map, or heat distribution pattern, to be automatically obtained in the parison in view of obtaining the desired thicknesses in the bottom of the bottle.

Based on such an observation, and it being further obvious that each type of bottle requires a special parison, it is possible for the ideal thickness profile to be identified experimentally for each bottle, and therefore for the respective parison, in view of obtaining the results that are the actual purpose of the present invention as described in the foregoing description.

It has been particularly observed that there are a number of characterizations that are common to the various types of parisons and that, when applied individually or in different combination thereof, such characterizations tend to improve the results that can be achieved or enable the desired results to be obtained more easily, such characterizations basically including:

constancy of the angle a of inclination, with respect to the axis of the parison, of the inner wall and the outer wall of the sub-portion M in the shape of a frustum of cone, said angle ranging from 5° to 10°;

increase in the thickness SP2' of the sub-portion M by at least 10% with respect to the thickness SP1' of the remaining middle portion L, owing to the different levels at which the tapering of the outside and inside walls of the parison starts and terminates, respectively;

maintenance of the wall thickness SP4', all along the length of the portion P immediately below the sub-portion M, at a value which is equal to or, at any rate, not smaller than 5% with respect to said thickness SP1', so as to obtain the greatest extent of biaxial orientation in the zone 1 of the bottom;

the thickness SP3' of the wall at the lowest point of the end portion N has a value of approx. 0.7×SP1';

the height of the sub-portion M is determined experimentally based on the desired distribution of material in the bottom;

for the thickness in the contact zone of the base of a 'champagne'-type bottom, as referred to generally at A and A1 in the cross-sectional illustration appearing in FIG. 5, to be held more effectively, it has been ascertained experimentally that the geometry, ie. the shape of both the parison and the respective blow moulding tool must be such as to ensure that the contact zone of the base substantially corresponds to the median points 4 of the sub-portion M; this may be explained by the fact that such median points are, albeit not to a very considerable extent, subject to more intensive cooling and, therefore, are less prone to stretching and, as a result, to a reduction in their thickness.

A further benefit the present invention has been found from systematically performed experiments to derive from a greater extent of biaxial orientation; in fact, considering that in the sub-portion M of the parison the diameter D3' and D4' are smaller than D1' and D2', respectively, it ensues that the stretching ratios, considering Ø as the resting diameter (critical zone) of the bottle, are respectively greater. Such an increase in the extent of orientation, in the sense of an increase in the stretching ratio, amounts to anywhere between approx. 10% and 15% and depends on the actual size and shape of the bottle.

The increase in the extent of orientation is generally known to translate into an increase in the mechanical performance capabilities and, above all, a reduction of the stress cracking effect at the points 4, such an effect being commonly known to be the worst enemy of refillable bottles.

What is claimed is:

1. A preform for forming a container having a base with a central bottom and a lowermost seating surface having an annularly shaped contact with a supporting surface, said preform comprising:

an upper neck portion;

a middle body forming portion;

a lower base forming portion having a substantially hemispherical bottom part for forming the central bottom of the container, said substantially hemispherical bottom part having an external diameter and an internal diameter;

an intermediate portion between said middle body portion and said lower base forming portion, said intermediate portion comprising a frustoconical part with inner and outer surfaces that, as seen in cross section, extend straight at an angle to a central axis of said preform, said intermediate portion having an outer diameter and an inner diameter that both become smaller along said frustoconical part, and said intermediate portion being of substantially uniform thickness;

wherein the height at which the outer diameter of said intermediate portion begins to become smaller is higher than the height at which the inner diameter of said intermediate portion begins to become smaller; and wherein the outer diameter of said intermediate portion reduces to the external diameter of said hemispherical bottom part and the inner diameter of said intermediate portion reduces to the internal diameter of said hemispherical bottom part, the height at which the outer diameter of said intermediate portion reduces to the external diameter of said hemispherical bottom part being higher than the height at which the inner diameter of said intermediate portion reduces to the internal diameter of said hemispherical bottom part.

2. The preform of claim 1, wherein:

said intermediate portion has a thickness that is 5–10% less than the thickness of said middle body forming portion; and said inner and outer surfaces of said frustoconical part have an angle with the central axis between 5 and 10 degrees.

3. The preform of claim 2, wherein said lower base forming portion has a thickness at its lowest point that is 60% to 80% of the thickness of said middle body portion.

4. A preform for forming a container having a base with a central bottom and a lowermost seating surface having an annularly shaped contact with a supporting surface, said preform comprising:

an upper neck portion;

a middle body forming portion;

a lower base forming portion having a substantially hemispherical bottom part for forming the central bottom of the container, said substantially hemispherical bottom part having an external diameter and an internal diameter;

an intermediate portion between said middle body portion and said lower base forming portion, said intermediate portion comprising a frustoconical part with inner and outer surfaces that, as seen in cross section, extend straight at an angle to a central axis of said preform, said intermediate portion having an outer diameter and an inner diameter that both become smaller along said frustoconical part, and said intermediate portion being of substantially uniform thickness;

wherein the height at which the outer diameter of said intermediate portion begins to become smaller is lower than the height at which the inner diameter of said intermediate portion begins to become smaller; and wherein the outer diameter of said intermediate portion reduces to the external diameter of said hemispherical bottom part and the inner diameter of said intermediate portion reduces to the internal diameter of said hemispherical bottom part, the height at which the outer diameter of said intermediate portion reduces to the external diameter of said hemispherical bottom part being lower than the height at which the inner diameter of said intermediate portion reduces to the internal diameter of said hemispherical bottom part.

5. The preform of claim 4, wherein said intermediate portion has a thickness that is at least 10% greater than the thickness of said middle body forming portion.

6. The preform of claim 5, wherein said inner and outer surfaces of said frustoconical part have an angle with the central axis between 5 and 10 degrees.

7. The preform of claim 1, and having an outer surface free from annular recesses.

8. The preform of claim 4, and having an outer surface free from annular recesses.

9. The preform of claim 1, wherein said lower base forming portion has a thickness at its lowest point that is 60% to 80% of the thickness of said middle body portion.

* * * * *